United States Patent
Hou

(10) Patent No.: US 8,345,362 B2
(45) Date of Patent: Jan. 1, 2013

(54) LENS HOLDER AND CAMERA MODULE USING THE SAME

(75) Inventor: Sheng-Hung Hou, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/195,141

(22) Filed: Aug. 1, 2011

(65) Prior Publication Data

US 2012/0229924 A1    Sep. 13, 2012

(30) Foreign Application Priority Data

Mar. 10, 2011 (TW) .............................. 100108033 A

(51) Int. Cl.
*G02B 7/02* (2006.01)

(52) U.S. Cl. ..................... 359/820; 359/819; 359/811

(58) Field of Classification Search .......... 359/694–704, 359/811–830

See application file for complete search history.

(56) References Cited

U.S. PATENT DOCUMENTS 7,268,957 B2 *   9/2007   Frenzel et al. ................. 359/811
7,729,606 B2 *   6/2010   Webster et al. ............... 396/144

* cited by examiner

*Primary Examiner* — Mohammed Hasan

(74) *Attorney, Agent, or Firm* — Altis Law Group, Inc.

(57) ABSTRACT

A camera module includes a base board and a lens holder mounted on the base board. The lens holder includes a main body and at least one ventilation portion integrally formed with the main body. The main body includes a top wall and a peripheral wall extending from a peripheral edge of the top wall. The top wall and the peripheral wall cooperatively define an accommodating space. The top wall defines a viewing aperture through the top wall thereof and at least one riser vent positioned adjacent to the peripheral wall. The at least one ventilation portion covers the riser vent, and is made of a waterproof breathable material.

19 Claims, 3 Drawing Sheets

LENS HOLDER AND CAMERA MODULE USING THE SAME

BACKGROUND

1. Technical Field

The present disclosure relates to lens holder structures and, particularly, to a lens holder and a camera module using the lens holder capable of efficiently dissipating heat.

2. Description of Related Art

A commonly used camera module generally includes a printed circuit board (PCB), a lens holder placed on the PCB, an image sensor placed on the PCB and received in the lens holder, a lens barrel held by the lens holder, and a lens received in the lens barrel. The PCB, the lens holder, the lens barrel, and the lens cooperatively define an enclosed cavity, in which the image sensor is received. In operation, the image sensor generates heat, which cannot be efficiently dissipated. As a result, increased temperature and air pressure inside the enclosed cavity may cause the PCB to deform, which in turn may cause the displacement of the lens holder and the image sensor, thereby decreasing the image quality of the camera module.

Therefore, there is room for improvement within the art.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
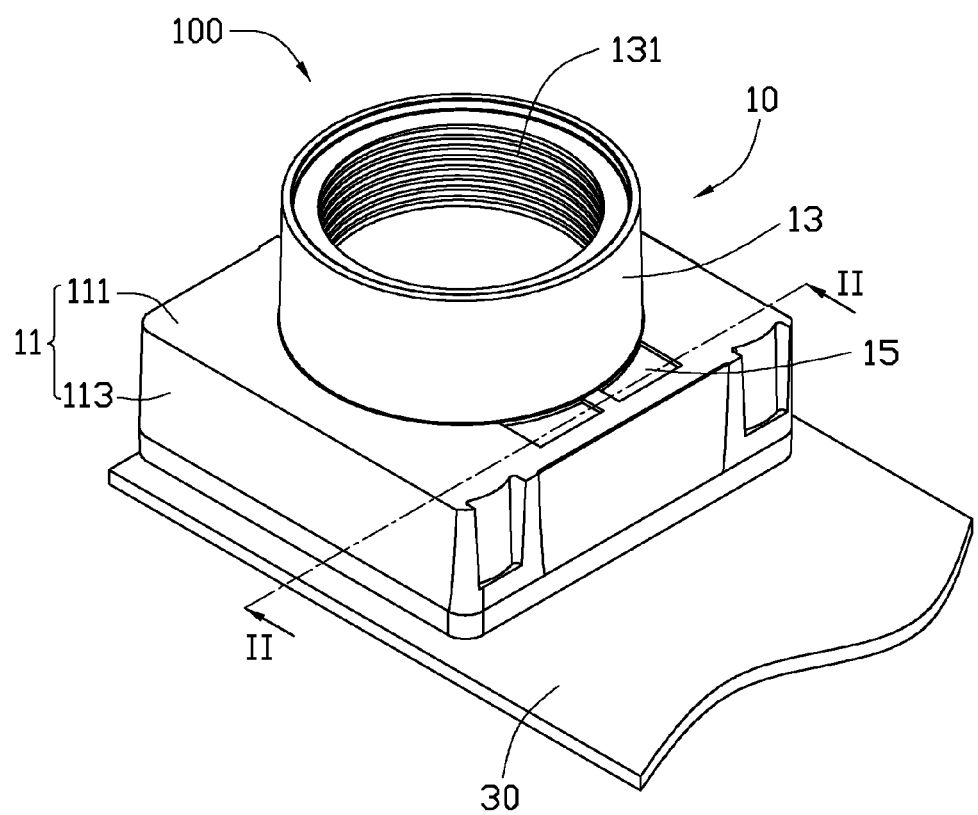
FIG. 1 is an isometric, assembled view of an embodiment of a camera module, including a lens holder.
Figure 2:
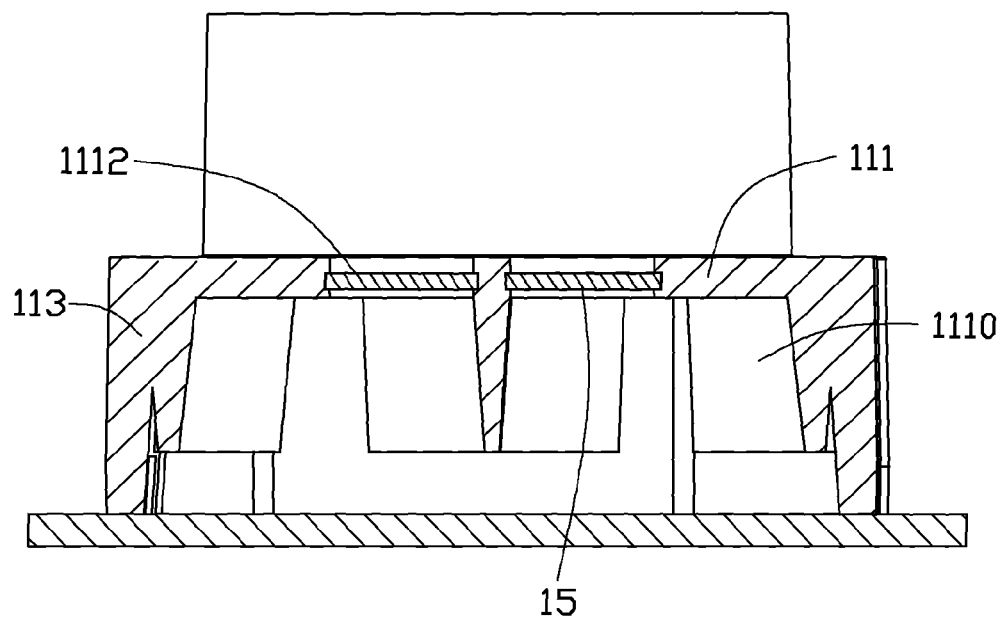
FIG. 2 is a cross-sectional view of the camera module, taken along a line II-II of FIG. 1.

Referring to FIGS. 1 and 2, an embodiment of a camera module 100 includes a base board 30 and a lens holder 10 placed or mounted on the base board 30. The camera module 100 may also include other electronic or optical components, such as an image sensor, a lens barrel, a lens, etc., which are not detailed here.

Figure 3:
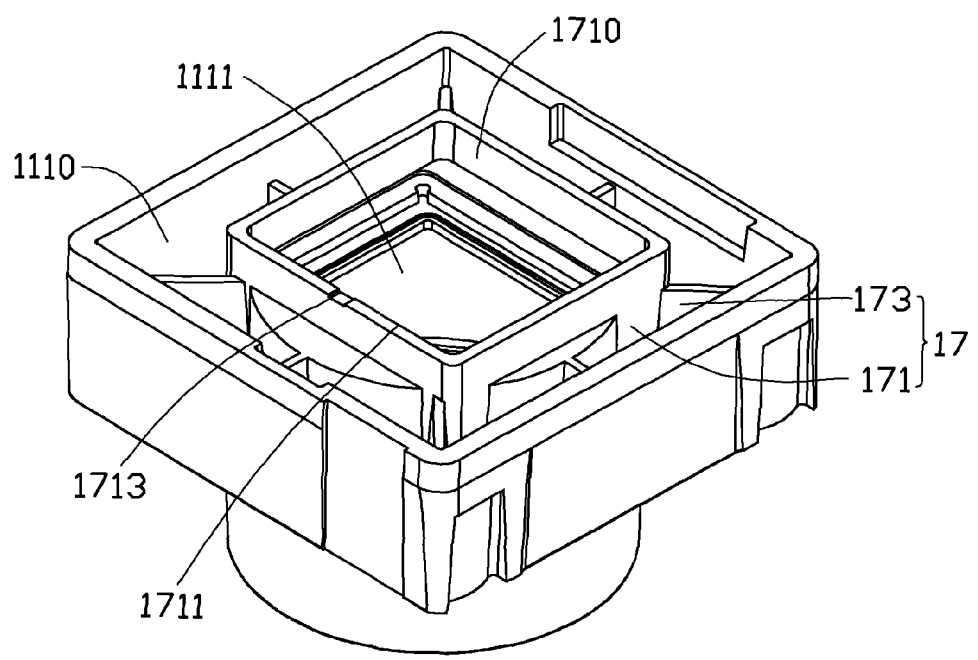
FIG. 3 is an isometric view of the lens holder of the camera module of FIG. 1.

Also referring to FIG. 3, the lens holder 10 includes a main body 11, an assembly portion 13, at least one ventilation portion 15, and a strengthening portion 17. The main body 11 is frame shaped, and includes a top wall 111 and a peripheral wall 113 extending from a peripheral edge of the top wall 11. In the illustrated embodiment, the main body 11 is a substantially rectangular frame including a substantially rectangular top wall 111 and a substantially rectangular peripheral wall 113. The peripheral wall 113 has four side walls perpendicularly extending from four side edges of the top wall 111. The top wall 111 and the peripheral wall 113 cooperatively define an accommodating space 1110. A substantially circular viewing aperture 1111 is defined through a substantially central portion of the top wall 111. At least one riser vent 1112 is defined through the top wall 111 and positioned adjacent to a peripheral edge of the top wall 111. In the illustrated embodiment, there are two riser vents 1112 separately defined through the top wall 111, and both riser vents 1112 are positioned between one side wall of the peripheral wall 113 and the viewing aperture 1111.

The assembly portion 13 is substantially a hollow cylinder, and extends upward from an outer surface of the top wall 111 of the main body 11, and is positioned away from the side of the peripheral wall 113. The assembly portion 13 aligns with the periphery of the viewing aperture 1111. The assembly portion 13 defines an assembly hole 131 having a plurality of internal threads, to communicate with the viewing aperture 1111, and is coaxial with the viewing aperture 1111. The assembly hole 131 is configured for assembling the lens components (not shown) of the camera module 100.

The ventilation portion 15 is integrally formed with the main body 11 and received within the corresponding riser vent 1112 for covering the riser vent 1112. The ventilation portion 15 is made of a waterproof breathable material, such as polyurethane, polyethylene, polypropylene, polyfluortetraethylene, and the like. In the illustrated embodiment, there are two ventilation portions 15. The two ventilation portions 15 are integrally formed with the main body 11 by double-mold injection molding process or in-mold labeling method, to cover the riser vents 1112.

The strengthening portion 17 is formed on an inner surface of the top wall 111, and positioned opposite to the assembly portion 13 and received within the accommodating space 1110. The strengthening portion 17 includes a protective frame 171 and a plurality of strengthening ribs 173. The protective frame 171 is substantially rectangular, and extends perpendicularly from the inner surface of the top wall 111 and surrounds the viewing aperture 1111. The protective frame 171 defines a receiving chamber 1710 for receiving the image sensor of the camera module 100, and has a distal end portion 1711 away from the top wall 111. The distal end portion 1711 defines a venthole 1713 to communicate with the ventilation portion 15. The strengthening ribs 173 separately extend from the protective frame 171 and connect to the top wall 111 and/or the peripheral wall 113, for strengthening the lens holder 10.

The base board 30 is substantially rectangular, and is fixed to the distal end of the peripheral wall 113, and is parallel to the top wall 111. In the illustrated embodiment, the base board 30 is a printed circuit board (PCB).

As the main body 11 and the ventilation portion 15 of the lens holder 10 are integrally formed by double-mold injection molding process, the lens holder 10 together with the camera module 100 using the lens holder 10 has a simple structure, and an improved stability. In use, the thermal or heat energy generated within the camera module 100 can be efficiently and quickly dissipated via the ventilation portion 15, thereby decreasing air pressure within the lens holder 10. Thus, the electronic components assembled within the camera module 100 are thereby efficiently protected, and any deformation to the parts is avoided, thereby increasing the image quality of the camera module 100 and prolonging the lifespan of the camera module 100.

It is to be understood that, the riser vent 1112 is not limited to being defined through the top wall 111, but may also be defined through the peripheral wall 113.

It is to be understood, however, that even through numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lens holder, comprising:
a main body comprising a top wall and a peripheral wall extending from a peripheral edge of the top wall, the top wall and the peripheral wall cooperatively defining an accommodating space; the main body comprising at least one riser vent defined through the top wall or the peripheral wall;
at least one ventilation portion integrally formed with the main body and covering the at least one riser vent, wherein the ventilation portion is made of a waterproof breathable material; and
a strengthening portion comprising a protective frame extending downward from an inner surface of the top wall and received within the accommodating space; the protective frame having a distal end portion away from the top wall, the protective frame comprising a venthole defined on the distal end portion and communicating with the accommodating space.

2. The lens holder of claim 1, wherein the ventilation portion is integrally formed with the main body by double-mold injection molding process or in-mold labeling method.

3. The lens holder of claim 1, wherein the waterproof breathable material for the ventilation portion is selected from the group consisting of polyurethane, polyethylene, polypropylene, and polyfluortetraethylene.

4. The lens holder of claim 1, wherein the main body is a substantially rectangular frame including a substantially rectangular top wall and a substantially rectangular peripheral wall, and the peripheral wall having four side walls perpendicularly extending from four side edges of the top wall.

5. The lens holder of claim 1, wherein the main body defines a viewing aperture through the top wall thereof, the lens holder further comprises an assembly portion extending upward from an outer surface of the top wall of the main body, and is positioned away from the peripheral wall side; the assembly portion defines an assembly hole to coaxially communicate with the viewing aperture.

6. The lens holder of claim 5, wherein the assembly portion defines a plurality of internal threads and an inner wall of the assembly hole aligns with the periphery of the viewing aperture.

7. The lens holder of claim 5, wherein the strengthening portion is formed on an inner surface of the top wall of the main body, and is positioned opposite to the assembly portion and is received within the accommodating space.

8. The lens holder of claim 7, wherein the protective frame surrounds the viewing aperture, the strengthening portion further comprises a plurality of strengthening ribs separately extending from the protective frame and connecting to the top wall and/or the peripheral wall of the main body.

9. The lens holder of claim 8, wherein the protective frame defines a receiving chamber communicating with the viewing aperture and the assembly hole.

10. A camera module, comprising:
a base board; and
a lens holder mounted on the base board; the lens holder comprising:
a main body comprising a top wall and a peripheral wall extending from a peripheral edge of the top wall, the top wall and the peripheral wall cooperatively defining an accommodating space; the top wall defining a viewing aperture through the top wall thereof and at least one riser vent positioned adjacent to the peripheral wall;
at least one ventilation portion integrally formed with the main body and covering the at least one riser vent; wherein the ventilation portion is made of a waterproof breathable material and
a strengthening portion comprising a protective frame extending downward from an inner surface of the top wall and received within the accommodating space; the protective frame having a distal end portion away from the top wall, the protective frame comprising a venthole defined on the distal end portion and communicating with the accommodating space.

11. The camera module of claim 10, wherein the at least one ventilation portion is integrally formed with the main body by double-mold injection molding process or in-mold labeling method.

12. The camera module of claim 10, wherein the waterproof breathable material is polyurethane, polyethylene, polypropylene, or polyfluortetraethylene.

13. The camera module of claim 10, wherein the main body is a substantially rectangular frame including a substantially rectangular top wall and a substantially rectangular peripheral wall, the peripheral wall having four side walls perpendicularly extending from four side edges of the top wall.

14. The camera module of claim 13, wherein the lens holder further comprises an assembly portion extending upward from an outer surface of the top wall of the main body, and is positioned away from the side of the peripheral wall; the assembly portion defines an assembly hole to coaxially communicate with the viewing aperture.

15. The camera module of claim 14, wherein the assembly portion defines a plurality of internal threads and an inner wall of the assembly hole aligns with the periphery of the viewing aperture.

16. The camera module of claim 14, wherein the strengthening portion is formed on an inner surface of the top wall of the main body, and is positioned opposite to the assembly portion and is received within the accommodating space.

17. The camera module of claim 16, wherein the protective frame surrounds the viewing aperture, the strengthening portion further comprises a plurality of strengthening ribs separately extending from the protective frame and connecting to the top wall and/or the peripheral wall of the main body.

18. The camera module of claim 17, wherein the protective frame defines a receiving chamber communicating with the viewing aperture and the assembly hole; the base board is fixed to the distal end of the peripheral wall of the main body and is parallel to the top wall.

19. The camera module of claim 10, wherein the base board is a printed circuit board.

* * * * *